United States Patent
Marion et al.

(10) Patent No.: US 9,634,999 B1
(45) Date of Patent: Apr. 25, 2017

(54) MOBILE DEVICE KEY MANAGEMENT

(71) Applicant: MOBILE IRON, INC., Mountain View, CA (US)

(72) Inventors: Eric M. Marion, San Francisco, CA (US); Robert Elliott Whiteman, San Francisco, CA (US)

(73) Assignee: MOBILE IRON, INC., Mountain View, CA (US)

( * ) Notice: Subject to any disclaimer, the term of this patent is extended or adjusted under 35 U.S.C. 154(b) by 232 days.

(21) Appl. No.: 14/533,008

(22) Filed: Nov. 4, 2014

Related U.S. Application Data

(60) Provisional application No. 61/899,403, filed on Nov. 4, 2013.

(51) Int. Cl.
| | |
|---|---|
| H04L 9/32 | (2006.01) |
| G06F 21/00 | (2013.01) |
| H04L 29/06 | (2006.01) |
| H04W 12/04 | (2009.01) |

(52) U.S. Cl.
CPC ........ *H04L 63/0428* (2013.01); *H04L 63/061* (2013.01); *H04L 63/0838* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 6,064,736 A * | 5/2000 | Davis | G06F 21/31 380/30 |
| 6,754,349 B1 * | 6/2004 | Arthan | H04L 9/0894 380/268 |
| 8,000,472 B2 | 8/2011 | Suga | |
| 2002/0194209 A1 | 12/2002 | Bolosky | |
| 2004/0177272 A1 * | 9/2004 | Walters | G06F 21/46 713/183 |
| 2005/0117746 A1 | 6/2005 | Benaloh | |
| 2007/0266258 A1 * | 11/2007 | Brown | H04L 9/0822 713/183 |
| 2008/0148042 A1 * | 6/2008 | Brown | H04L 63/06 713/154 |
| 2008/0313721 A1 * | 12/2008 | Corella | G06F 21/31 726/6 |
| 2011/0246783 A1 | 10/2011 | Unagami | |
| 2013/0117575 A1 | 5/2013 | Kataoka | |

* cited by examiner

*Primary Examiner* — Fatoumata Traore
(74) *Attorney, Agent, or Firm* — Van Pelt, Yi & James LLP

(57) ABSTRACT

Mobile device key management is disclosed. A master key is secured using a password-based key to generate a first encryption information. The password-based key is generated based at least in part on a password associated with a mobile device. The master key is also secured using an unlock key to generate a second encryption information. The unlock key is stored at a server, and in certain cases is not stored on the mobile device. The first encryption information and the second encryption information are stored on the mobile device. The mobile device is configured to extract the master key from the first encryption information using the password. In the event that the master key is not extracted using the password, the mobile device is configured to extract the master key from the second encryption information using the unlock key received from the server.

20 Claims, 13 Drawing Sheets

1100

US 9,634,999 B1

MOBILE DEVICE KEY MANAGEMENT

CROSS REFERENCE TO OTHER APPLICATIONS

This application claims priority to U.S. Provisional Patent Application No. 61/899,403, entitled MOBILE DEVICE DATA ENCRYPTION filed Nov. 4, 2013 which is incorporated herein by reference for all purposes.

BACKGROUND OF THE INVENTION

Mobile device data is often stored in a secure manner using encryption keys. In various existing systems, a master encryption key used to secure data on a mobile device may be stored on the device, at a device management server, and/or other node. Storing the encryption key on the mobile device, server, and/or other node, however, may result in certain vulnerabilities if, for example, the encryption key is accessed by an adversary. In some existing systems, a master encryption key is derived from a mobile device user password. In this case, certain vulnerabilities may arise when a user forgets their passcode. It would be useful if a scheme for mobile device key management could be developed that would provide security of data on a device and allow for secure password recovery.

BRIEF DESCRIPTION OF THE DRAWINGS

Various embodiments of the invention are disclosed in the following detailed description and the accompanying drawings.

DETAILED DESCRIPTION

Figure 1:
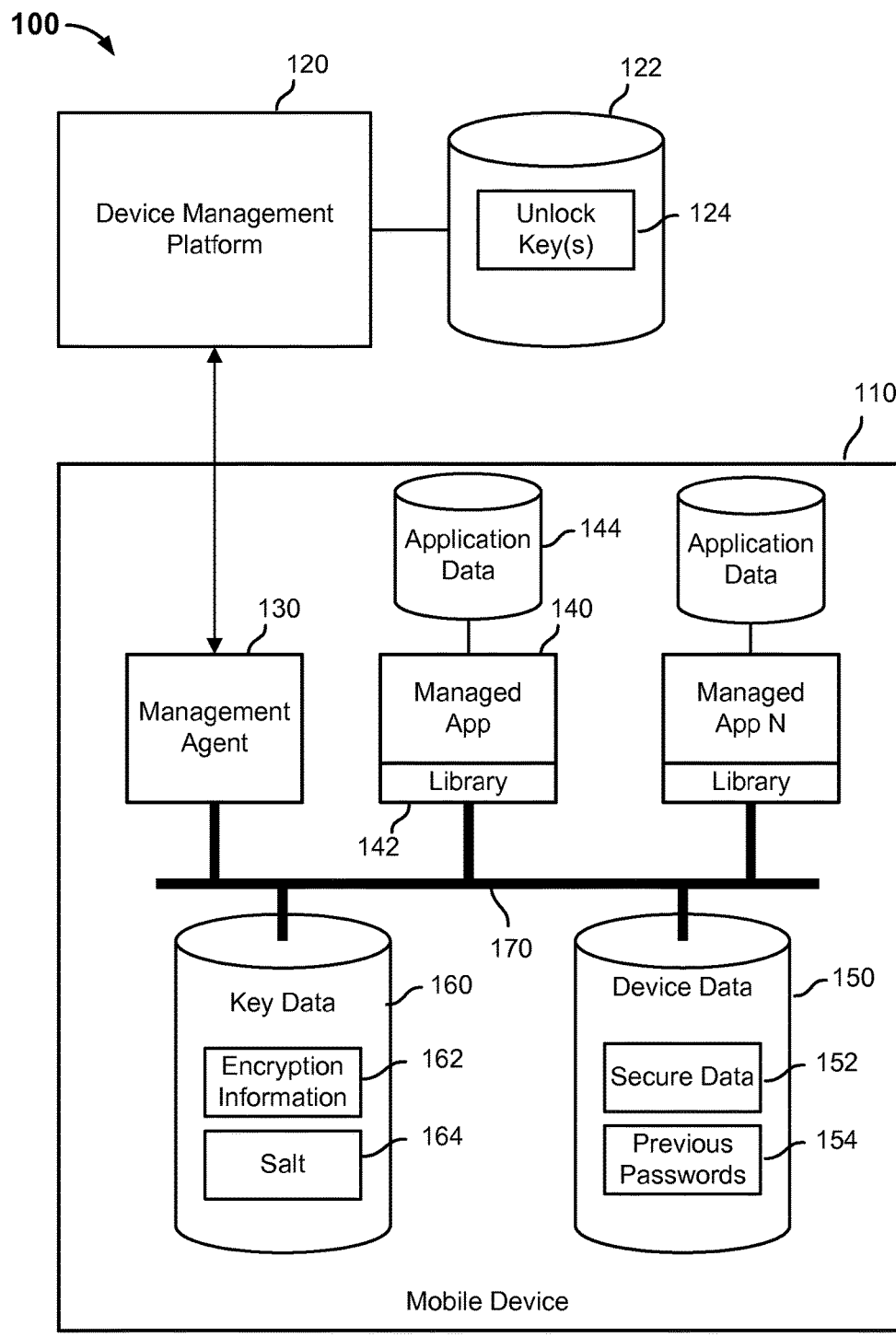
FIG. 1 is a block diagram illustrating embodiments of a system to manage keys on a mobile device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Mobile device key management is disclosed. A master key and/or a keys derived from a master key are used to encrypt data on a device. In various embodiments, a master key is secured using a password-based key to generate a first encryption information. The first encryption information may include the master key encrypted using the password-based key. The password-based key is generated based at least in part on a password associated with a mobile device, a salt, and/or other information. The master key is also secured using an unlock key to generate a second encryption information. The second encryption information may include the master key encrypted using the unlock key. The unlock key is stored at a server, and in certain cases is not stored on the mobile device. The first encryption information and the second encryption information are stored on the mobile device. The mobile device is configured to extract the master key from the first encryption information using the password (e.g., received from a user). In the event that the master key is not extracted using the password, the mobile device is configured to extract the master key from the second encryption information using the unlock key received from the server.

FIG. 1 is a block diagram illustrating embodiments of a system to manage keys on a mobile device. In the example shown, a system 100 includes a mobile device 110, a device management platform 120 (e.g., security management platform), and/or other components. The mobile device 110 may include a smartphone, tablet, and/or any other type of mobile device. The mobile device 110 may include components such as a management agent 130, managed application(s) 140, device data storage 150, key data storage 160, and/or other components. In certain cases, the managed applications 140 are managed by the device management agent 130. Managed applications 140 may include and/or be modified to include a library 142 (e.g., a key management library). The library 142 may be, for example, compiled into the application, injected into the application, added to the application by wrapping, added as a software development kit (SDK), and/or otherwise added to a managed application 140. The library 142 may configure the managed application 140 for use in a mobile device management (MDM) environment by, for example, allowing the device management agent 130 to control the managed application 140 and/or perform actions on behalf of the managed application 140. The library 142 may configure a managed application 140 to perform the operations disclosed herein. For example, a library 142 may include a key management library that executes various key-related operations as discussed herein. In some embodiments, the device management agent 130 provides information to and/or receives information from the managed applications 140 and/or libraries 142 associated with the managed applications via a secure application connection bus 170.

In various embodiments, a secure application connection bus 170 may include and/or operate in conjunction with one or more libraries 142, the management agent 130, and/or other components to perform various operations disclosed herein. File encryption for the secure application connection bus 170 may include two layers: a key management layer and an encryption layer. A key management layer of the secure application connection bus 170 manages encryption keys for the device 110, managed applications 140, management agent 130, and/or other components of the device.

In some embodiments, a mobile device data storage 150 may include a global storage, shared file storage, shared directory, and/or other type of storage for the mobile device 110 (e.g., as a whole). In certain cases, the device data storage 150 includes a secure digital (SD) card for the device 110. In some embodiments, a device data storage 150 stores secure data 152 (e.g., secure application data, mobile device data, and/or any other type of data), a password history list 154, and/or any other data (e.g., data stored in the clear, non-secure mobile device data, etc.).

In various embodiments, managed applications 140 may include and/or be associated with an application data storage 144. The application data storage 144 may include a private data storage, directory, and/or file store for the managed application 144. In certain cases, an application data storage 144 is only accessible to and/or private to one managed application 140. In other cases, an application data storage 144 is accessible to multiple managed applications 140 including, for example, a set of managed applications. In certain cases, the application data storage 144 includes a sub-storage within the device data storage 150.

According to some embodiments, a key data storage 160 on the device may store encryption information 162 including, for example, first encryption information (e.g., a master key encrypted using a password-based key), second encryption information (e.g., the master key encrypted using an unlock key), and/or other encryption information. The key data storage 160 may also store a salt 164. As discussed below, a salt 164 may be used to generate password-based keys, secure previous password hash values stored in the password history file 154, and/or to generate other cryptographic information. In certain cases, a single salt value 164 is used for multiple cryptographic operations on the device 110. In some embodiments (not shown), the key data storage 160 is included in (e.g., a sub-directory of, a storage within) the device data storage 150.

In some embodiments, a master key is generated. In certain cases, the master key is generated by the secure application connection bus 170, a library 142, the management agent 130, and/or other components on the device 110. In other cases, the master key is generated at a device management server 120 and sent to the mobile device 110. The master key may be generated using a cryptographically-secure pseudorandom number generator and/or other random number generation module. The master key and/or keys derived from the master key are used to encrypt secure data 152, data stored in application data storage 144, and/or any other data stored on the device 110. In some embodiments, the secure application connection bus 170, a library 142, and/or other component on the device may secure the master key using a password-based key to generate a first encryption information (e.g., password-based encryption information). In some cases, the first encryption information is stored in a key data repository 160 on the device. The password-based key is generated based at least in part on a password associated with a mobile device, a salt 164, and/or other information. In some embodiments, the master key is also secured using an unlock key 124 to generate a second encryption information (e.g., server-based encryption information). The second encryption information may include the master key encrypted using the unlock key 130. In certain cases, the second encryption information is stored in a key data repository 160 on the device. In some embodiments, the unlock key 124 is generated at the security management platform 120 and used to encrypt the master key (e.g., also generated at the security management platform 120) to generate the second encryption information at the security management platform 120. A copy of the unlock key 124 and the second encryption information are then sent to the mobile device 110. In various embodiments, the unlock key 124 is generated at the device 110, used to secure the master key, and sent to the device management platform 120. In this case, the unlock key 124 is generated at the device 110 and temporarily stored in random access memory (RAM) until it can be uploaded to the device management platform 120. In various embodiments, the unlock key 124 is stored at a server, such as device management platform 120, after generation of the second encryption information. In certain cases, the unlock key 124 is stored in a storage 122 associated with the device management platform 120. The unlock key 124 may, however, not be stored in a persistent memory on the device.

In various embodiments, the secure application connection bus 170, a library 142, and/or other components on the device 110 are configured to extract the master key from the first encryption information using the password (e.g., received from a user). In the event that the master key is not extracted using the password, the mobile device is configured to extract the master key from the second encryption information using the unlock key 124 received from the server.

Figure 2:
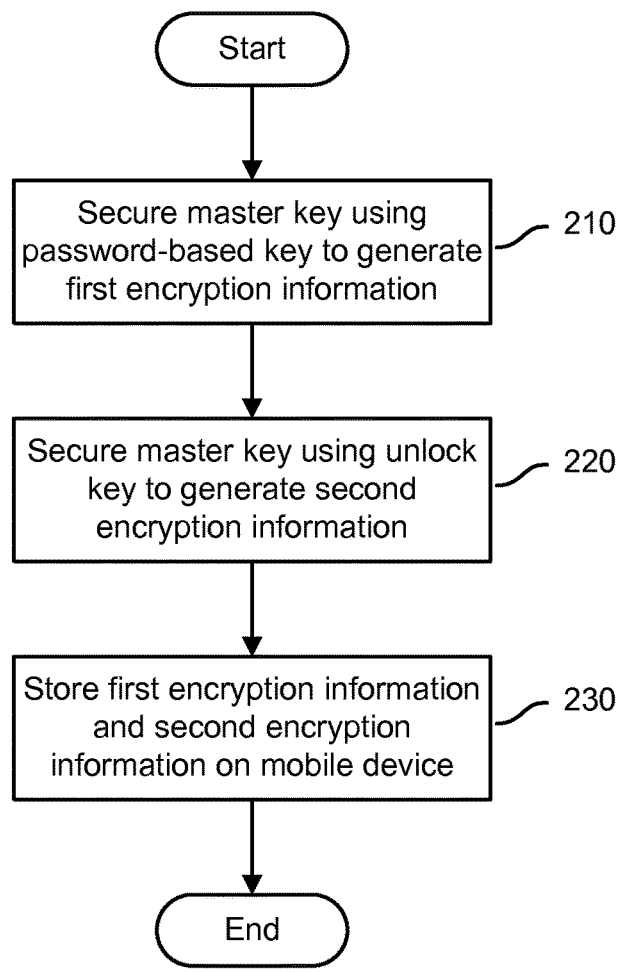
FIG. 2 is a flow chart illustrating embodiments of a process to secure key information.

FIG. 2 is a flow chart illustrating embodiments of a process to secure key information. At 210, a master key is secured using a password-based key to generate a first encryption information. A master key may include a master key associated with a mobile device, an application, a set of applications, a file, a set of files, director(ies), and/or a mobile device user. In various embodiments, a master key is generated using, for example, a pseudo-random number generator and/or other random number generation approach. In some embodiments, a password-based key is generated based on a mobile device password (passcode), a salt, and/or other information. In one example, a password-based key is generated using Password-Based Key Derivation Function 2 (PBKDF2) and/or any other key derivation technique.

In various embodiments, a master key is encrypted using a password-based key to generate a first encryption information (e.g., password-based encryption information). The master key may be encrypted using various encryption approaches, such as American Encryption Standard 128, AES 256, AES Cipher Block Chaining (AES-CBC), and/or any other encryption approach. An encryption algorithm may receive as inputs plaintext including the master key, a key including the password-based key, and/or other information. The output of the encryption algorithm includes the first encryption information, and the first encryption includes ciphertext comprising the master key.

At 220, the master key is secured using an unlock key to generate a second encryption information. In various embodiments, the unlock key is used to encrypt the master key and the result and/or output of the encryption operation is the second encryption information (e.g., server based-encryption information). An encryption algorithm may receive as inputs plaintext including the master key, a key including the unlock key, and/or other information. The output of the encryption algorithm includes the second encryption information. In various embodiments, the second encryption information includes cipher text comprising the master key. In various embodiments, the unlock key is stored at a server after generation of the second encryption information.

In some embodiments, the master key is stored in RAM on the mobile device until the first encryption information and/or second encryption information have been generated. For example, the master key may be stored in device-level and/or an application-specific RAM. In some cases, the RAM is cleared when the device is powered down, when an application is closed (e.g., killed), when the operating system closes an application, and/or at other times. And the master key is deleted when the RAM is cleared. In various embodiments, the master key is stored in persistent memory during generation of the first encryption information and/or second encryption information. And after generation of the first and second encryption information master key is removed from the device. The master key is not stored persistently in plain text on the device after generation of the first encryption information and second encryption information. Not storing the master key in plain text on the mobile device, server, and/or other nodes may make it more difficult for an adversary to gain access to the master key and, as a result, may help to avoid certain security vulnerabilities. For example, in certain prior art systems in which the master key is stored on the device, server, and/or other node, an adversary may gain access to encrypted files on a device simply by compromising the mobile device, device management server, and/or other node to acquire the master key. Using the techniques disclosed herein, gaining access to an encrypted file may require compromising the device management server to retrieve the unlock key, compromising the mobile device security framework to retrieve the second encryption information, and using the unlock key to extract the master key from the second encryption information. These steps require significantly more effort than simply compromising the device and/or server to steal the master key. Though the master key is not stored in plain text, the master key may be extracted from either the first encryption information and/or second encryption information for user by the device and/or applications as discussed in detail below.

At 230, the first encryption information and second encryption information are stored on the mobile device. In various embodiments, the first encryption information and second encryption information are stored in a key information repository on the device (e.g., key information storage 160 of FIG. 1). As discussed in detail below, the master key may be extracted from the first encryption information using the user password. The master key may also be extracted from the second encryption information using the unlock key, for example, in the event that the password is invalid, lost, expired and/or not provided.

Figure 3:
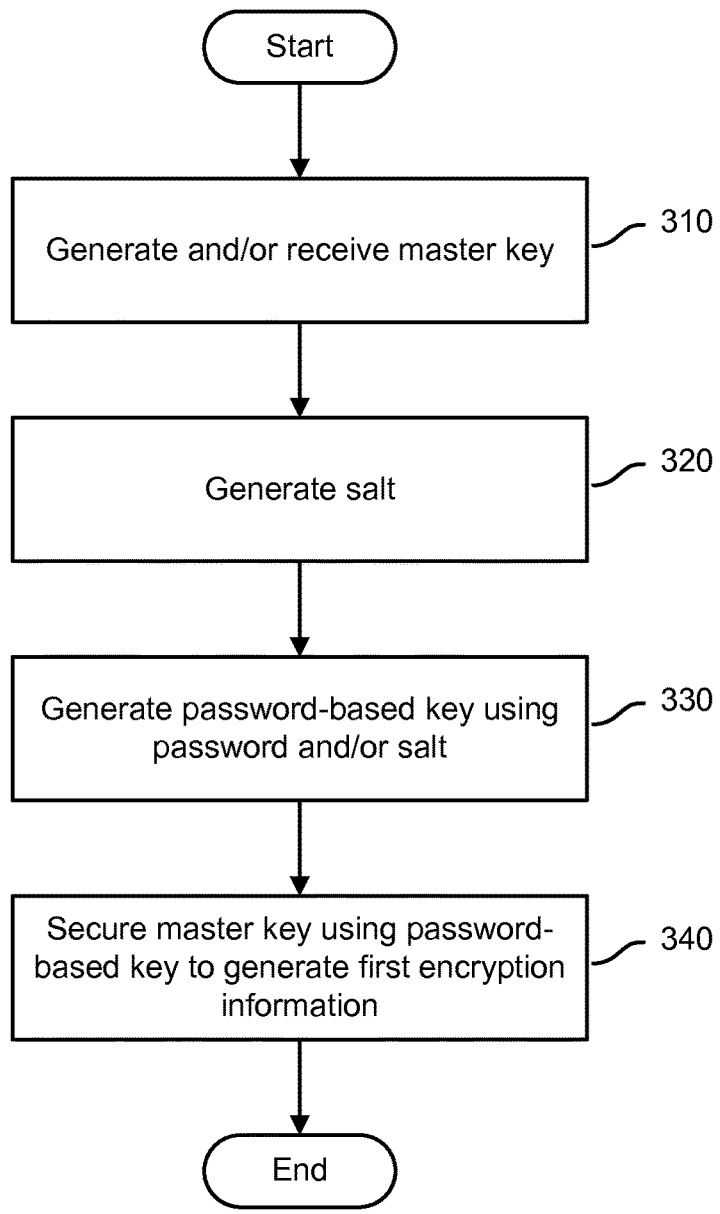
FIG. 3 is a flow chart illustrating embodiments of a process to generate encryption information.

FIG. 3 is a flow chart illustrating embodiments of a process to generate encryption information. In various embodiments, the process 300 is implemented by mobile device 110 of FIG. 1. At 310, a master key is generated and/or received. A master key may be generated using, for example, a cryptographically-secure pseudo-random number generator and/or other random number generation approach. The master key may include a randomly generated value. In some embodiments, a master key is generated at a mobile device. In this case, the mobile device may use a cryptographically-secure pseudorandom number generate to generate the master key.

In various embodiments, the master key is generated at a server, such as a mobile device management server. In one example, a server generates the master key, encrypts the master key using an unlock key to generate second encryption information (as discussed below), and/or sends the second encryption information and the unlock key to the mobile device. The mobile device may use the unlock key to extract the master key from the second encryption information (e.g., the master key encrypted using the unlock key). In another example, the server may send the master key to the mobile device in the clear, though this approach may be less secure than sending the second encryption information and unlock key.

At 320, a salt is generated. In various embodiments, a salt includes a random value. The salt may be generated using, for example, a cryptographically-secure pseudorandom number generator and/or other random number generation approach. The salt may include, for example, a 128 bit random value, 256 bit random value, and/or random value. In certain cases, one salt is generated for a mobile device (as a whole), and the salt is used for various purposes. In one example, a salt is used to generate a password-based key, is used to securely store previously-used passwords, and/or is used for other purposes. In some embodiments, this step may not be performed. In certain implementations, the password-based key is generated from the password without the use of a salt, and in this case the salt may not be generated. The password-based key may, for example, include a hash of the password that is generated using a hashing function that does not receive a salt as an argument.

At 330, a password-based key is generated based on a password, a salt, and/or other information. In various embodiments, a password may include any password and/or passcode associated with the device. In one example, the password includes a password and/or passcode used to gain access to the mobile device and/or a portion of the mobile device, such as managed applications, data, and/or other resources on the device. In another example, the password includes a password associated with a user of the device and/or group of device users.

In some embodiments, the password-based key is derived from the password using a key derivation function, a hashing function, and/or other techniques. In one example, a password-based key is generated using PBKDF2 and/or any other key derivation function. The PBKDF2 may receive as inputs a pseudorandom function, the mobile device password, a salt, a number of iterations, desired length of password-based key, and/or other information. Using a key derivation function that receives a salt as input may make the password-based key and/or first encryption information less vulnerable to certain brute force attacks, dictionary attacks, and/or other potential threat vectors. The number of iterations used in a key derivation function may include the highest number of iterations that will not result in significant device slow down during password-based key generation. The higher number of iterations used, the less susceptible the password-based key is to certain brute force attacks. In one example, the number of iterations is set to 10,000 iterations, which may correspond to a processing time of 0.10 seconds to generate the password-based key. Using 10,000 iterations may make brute force attempts to extract the password-based key difficult, while minimally impacting mobile device user experience.

At 340, the master key is secured using the password-based key to generate a first encryption information. As discussed above, a master key may be encrypted using a password-based key to generate a first encryption information. The master key may be encrypted using various encryption approaches. In various embodiments, the first encryption information includes cipher text comprising the master key.

In various embodiments, the master key is temporarily stored in RAM during the generation of the first encryption information on the mobile device. The RAM may be cleared after the generation of the first encryption information and the master key removed from the device. In some embodiments, the master key is stored on the device (e.g., in device memory) during generation of the first encryption information, and in this case, the master key is removed (deleted) from the mobile device after generation of the first encryption information and/or second encryption information.

Figure 4A:
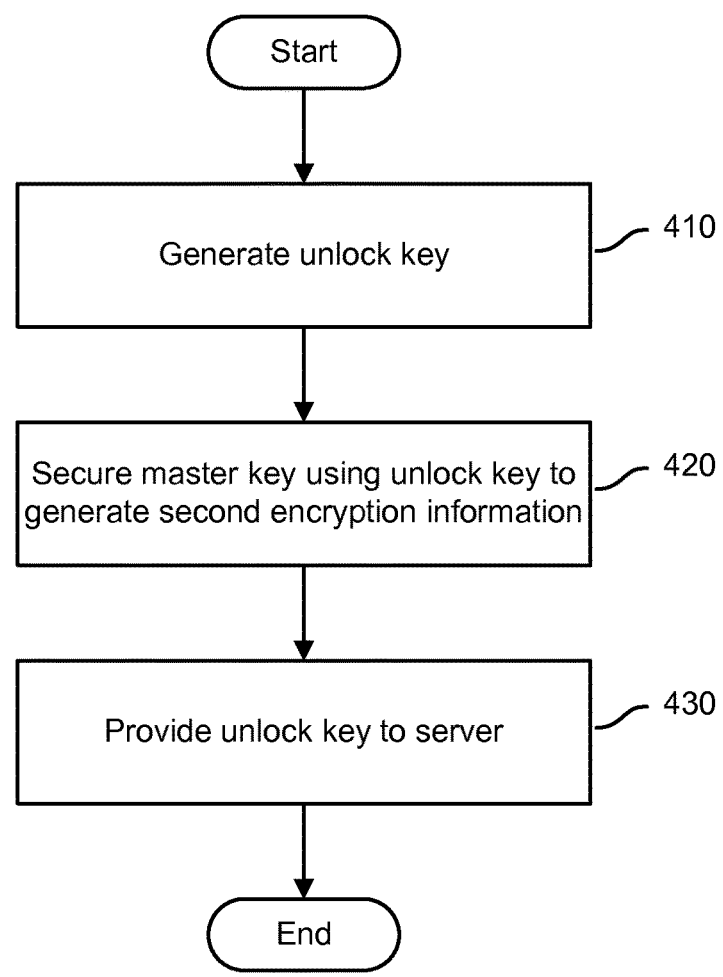
FIG. 4A is a flow chart illustrating embodiments of a process to generate encryption information.

FIG. 4A is a flow chart illustrating embodiments of a process to generate encryption information. In various embodiments, the process 400 is implemented by mobile device 110 of FIG. 1. At 410, an unlock key is generated. In various embodiments, an unlock key is generated at the mobile device using a cryptographically-secure pseudo-random number generator and/or other random number generation module included in the mobile device. At 420, the master key is secured using an unlock key to generate a second encryption information. In various embodiments, the unlock key is used to encrypt the master key, and the result and/or output of the encryption operation is the second encryption information.

At 430, the unlock key is provided to the server. In some embodiments, the unlock key is provided to a server (e.g., a mobile device management server 120 of FIG. 1) after generation of the second encryption information. As discussed below, the mobile device and/or mobile device user may request the unlock key from the server at a later time. For example, in the event that the user loses (forgets) the password and the master key cannot be extracted from the first encryption information, the mobile device may retrieve the unlock key from the server to extract the master key from the second encryption information.

In various embodiments, the unlock key is stored RAM while the second encryption information is generated and is sent to the server upon generation of the second encryption information. When the RAM is cleared after generation of the second encryption information, the unlock key may no longer be present on the mobile device. In other embodiments, the unlock key is stored in persistent memory (e.g., flash memory) on the device, and in this case the unlock key is removed from the mobile device after the generation of the second encryption information. Not storing the unlock key on the device after generation of the second encryption information ensures that the second encryption information is inaccessible without first contacting the server and/or administrator associated therewith. In certain cases, a user that has lost their password may be required to verify their identity with the device management server. Upon verification of the user's identity (e.g., via user provided credentials, password challenge questions, etc.), the management may send the unlock key to the mobile device, and the unlock key may be used to extract the master key from the second encryption information.

Figure 4B:
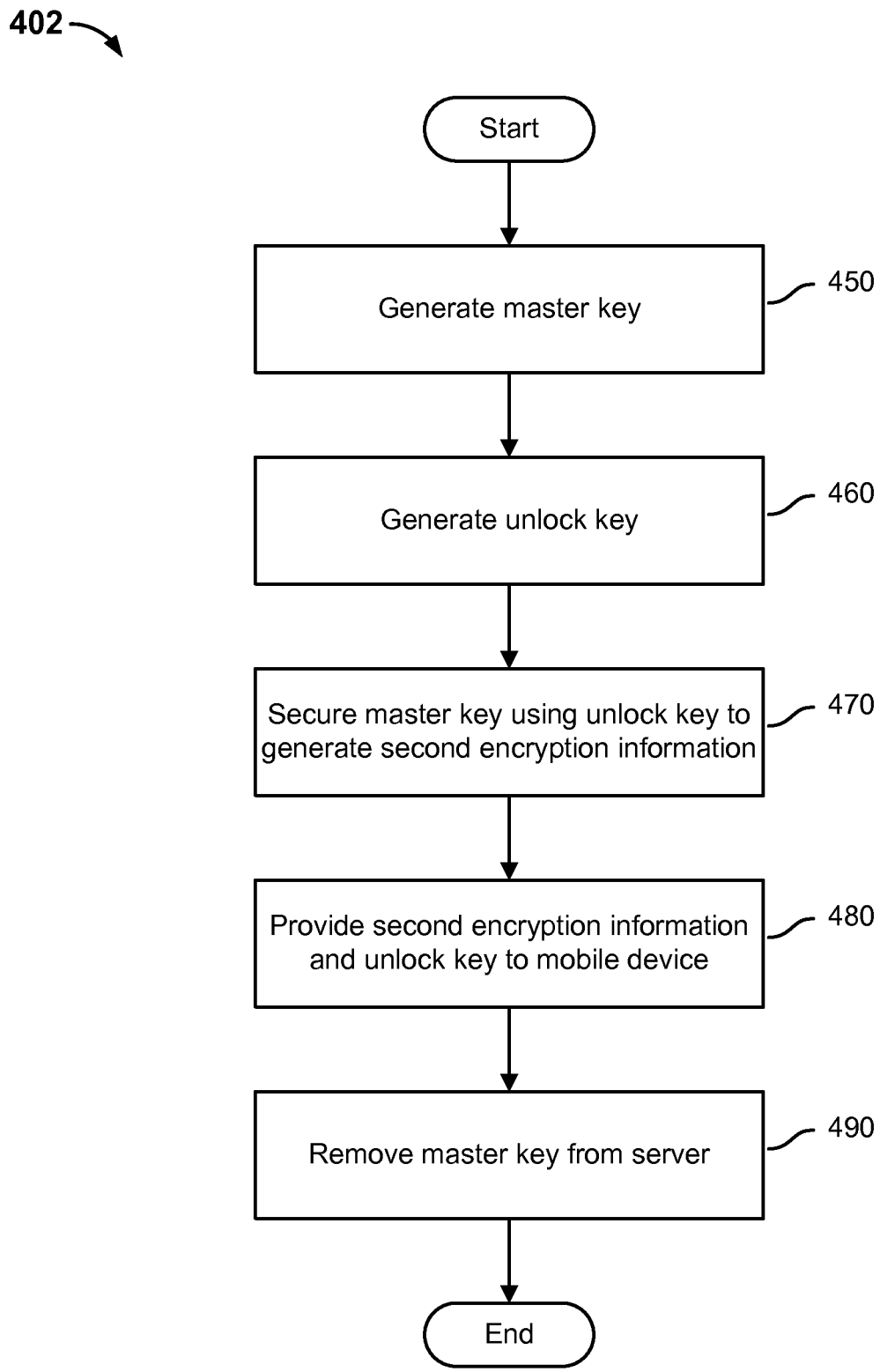
FIG. 4B is a flow chart illustrating embodiments of a process to generate encryption information.

FIG. 4B is a flow chart illustrating embodiments of a process to generate encryption information. In various embodiments, the process 402 is implemented by device management server 120 of FIG. 1. At 450, a master key is generated. In some embodiments, a master key may be generated at the server using, for example, a cryptographically-secure pseudorandom number generator and/or other random number generation approach. At 460, an unlock key is generated. In various embodiments, an unlock key is generated at the server using a cryptographically-secure pseudo-random number generator and/or other random number generation module. At 470, the master key is secured using an unlock key to generate a second encryption information. In various embodiments, the unlock key is used to encrypt the master key, and the result and/or output of the encryption operation is the second encryption information.

At 480, the second encryption information and unlock key are provided to the mobile device. In various embodiments, the server sends the second encryption information and the unlock key to the mobile device. As discussed above, the mobile device may use the unlock key to extract the master key from the second encryption information. And the mobile device may generate a first encryption information by encrypting the master key using a password-based key.

At 490, the master key is removed from the server. As discussed above, removing the master key from the server, mobile device, and/or other nodes may make it more difficult for an adversary to gain access to the encrypted data on a mobile device. As discussed below, removing the master key from the server may also allow the encrypted files on a device to be effectively wiped by simply deleting two files: the first encryption information and second encryption information.

In various embodiments, step 490 is not performed. In certain cases, the master key is stored in a temporary storage (e.g., RAM) at the server, and upon generation of the second encryption information and/or shortly thereafter the RAM may be cleared and the master key removed from the RAM and the server.

Figure 5:
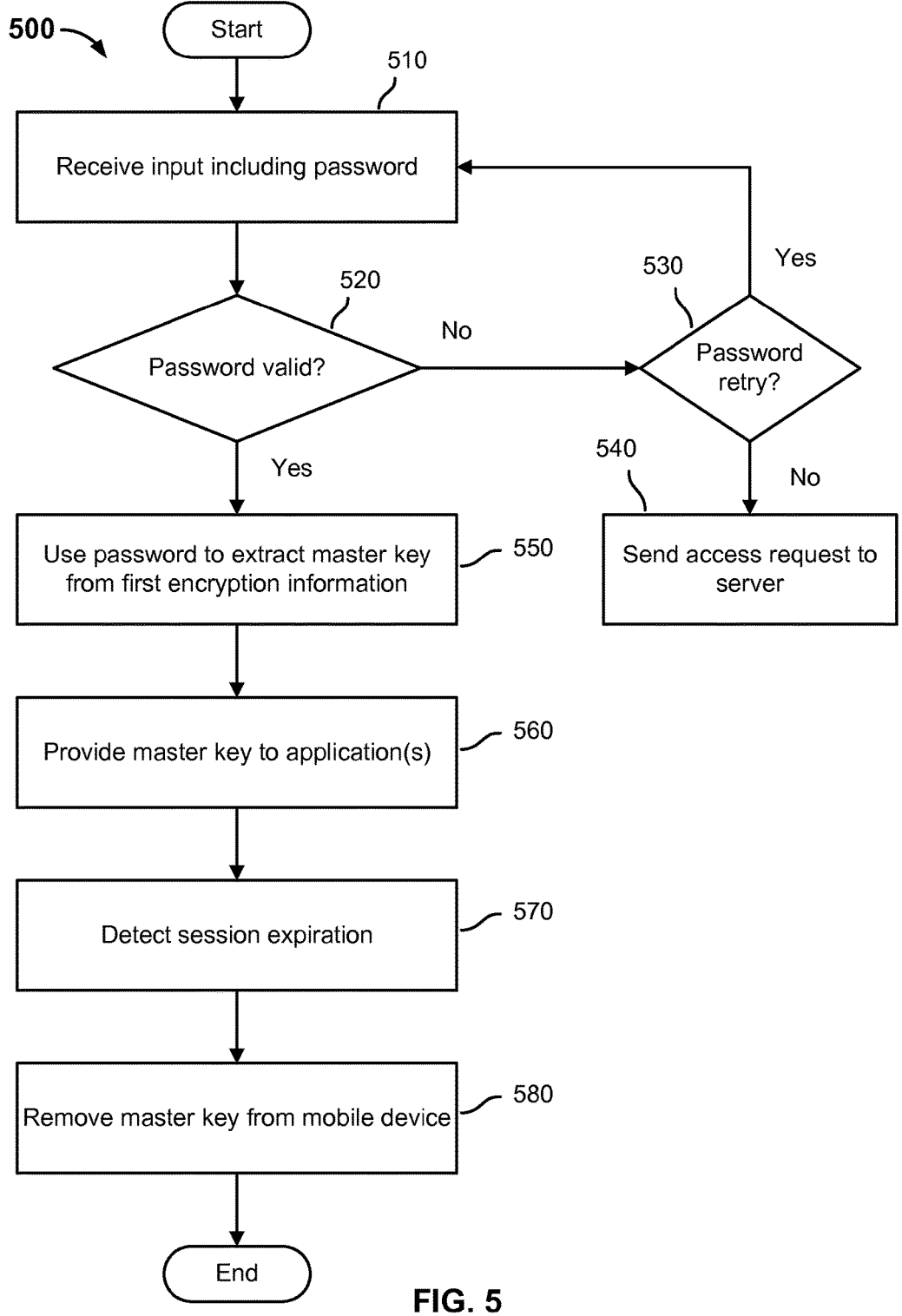
FIG. 5 is a flow chart illustrating embodiments of a process to extract a key from encryption information.

FIG. 5 is a flow chart illustrating embodiments of a process to extract a key from encryption information. In various embodiments, the process 500 is implemented by mobile device 110 of FIG. 1. At 510, input including a password is received. In various embodiments, input including a password is received at a mobile device from, for example, a user. A user may enter a password to gain access to a mobile device, for example, when the device is in a locked state. In another example, a password is received from a user to access a secure portion of the mobile device.

At 520, it may be determined whether the received password is valid. In some embodiments, the received password may be compared to a list of currently-valid passwords stored on the device. In the event the received password is determined to be not valid, the process may proceed to step 530. In the event the received password matches a currently-valid password, it may be determined that the password is valid and the process proceeds to step 550.

At 530, it is determined whether a password retry prompt is to be output to a user. In some embodiments, a system may include password throttling logic that includes a limit on a number of failed password entries. In the event that the number of failed password attempts exceeds a threshold number, the process may proceed to step 540. In the event the number of failed password attempts does not exceed a threshold number, a user may be prompted to reenter the password and/or the process proceeds to step 510.

At 540, a request for access to the secured data on the device may be sent to the server. In various embodiments, a device management server evaluates whether to provide the user access to the secure data on the device. In the event the identity of the user is validated, the management server may provide an unlock key to the mobile device. And the unlock key may be used to extract the master key from the second encryption information (as discussed below). In certain cases, a password reset operation may also be initiated.

At 550, the password is used to extract the master key from the first encryption information. In various embodiments, the received password, a salt, and/or other information are used to generate a password-based key. The salt may include the salt that was used to derive the first encryption information as discussed above. The password-based key may be derived using a key derivation function (such as PBKDF2) and/or other approaches. Assuming the received password is the same as the password used to generate the first encryption information, the password-based key generated based on the received password, salt, and/or other information may be the same as the password-based key used to generate the first encryption information. The password-based key generated from the received password is used to extract the master key from the first encryption information. In one example, the password-based key is used to decrypt the first encryption information, which includes the master key encrypted with the password-based key.

At 560, the master key is provided to one or more applications. In various embodiments, the master key extracted from the first encryption information is provided to a library associated with an application (e.g., library 142 of FIG. 1). The library associated with the application may pass the master key to an encryption layer, and the master key and/or encryption key(s) derived therefrom are used to access secured data (e.g., secured application data, files, etc.) on the mobile device. In some embodiments, the master key is stored in RAM and is not stored to persistent memory while in use by an application, library, management agent, and/or other components of the device.

At 570, a session expiration is detected. A session expiration may occur when the mobile device transitions into a locked state, when a user logs out of an MDM system operating on the device, a predetermined amount of time elapses, and/or upon the occurrence of other events.

At 580, the master key is removed from the mobile device. In various embodiments, librar(ies) associated with managed applications may discard the master key upon the expiration of a session. Once the master key has been removed from the device, secured data on the device will be inaccessible. In various embodiments, step 580 may not be performed (e.g., may be optional). In certain cases, the master key is store in RAM, and in this case the master key is removed when the RAM is cleared. In some embodiments, a user may be prompted to enter the password to, for example, regain access to the secured data on the device and the process proceeds to step 510.

Figure 6:
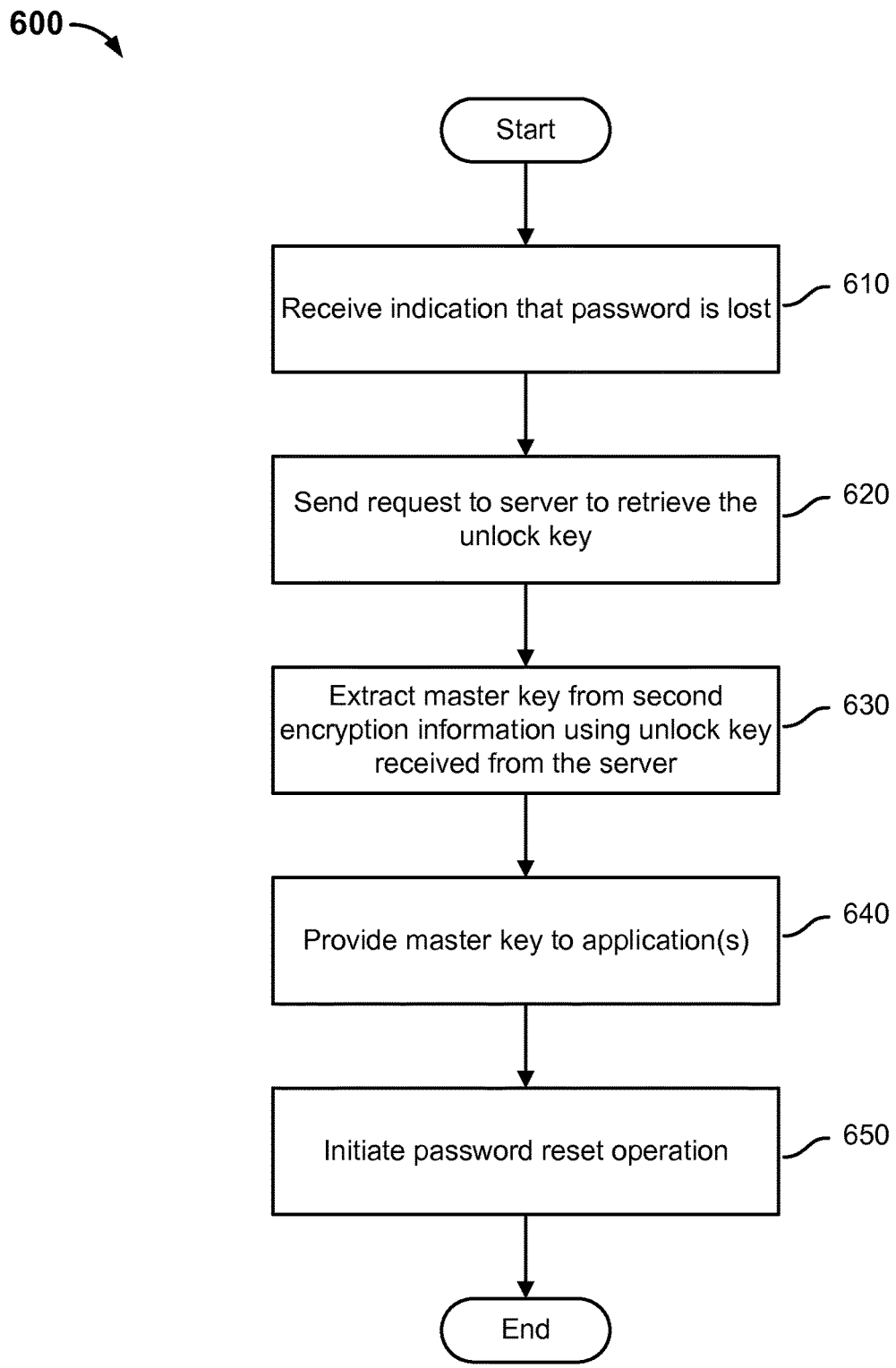
FIG. 6 is a flow chart illustrating embodiments of a process to recover access to secure files on a mobile device.

FIG. 6 is a flow chart illustrating embodiments of a process to recover access to secure files on a mobile device. In various embodiments, the process 600 is implemented by mobile device 110 of FIG. 1. At 610, an indication is received that a password is lost. In various embodiments, an indication is received at the mobile device that the user has lost (e.g., forgotten) the password. In one example, a user may select a lost password and/or password recovery link displayed on the device, and the indication is received based on the user's selection.

At 620, a request is sent to the server to retrieve an unlock key. In various embodiments, the mobile device generates a request for the unlock key and/or request for access to secured data on the device. The request is sent to a management server. The management server may evaluate the request and determine whether to provide access to the encrypted data on the device. In some cases, the management server may request that the user provide user credential information (e.g., full username and/or password credentials), challenge question answers, and/or other information to verify the identity of the user. In some embodiments, an administrator may contact a user associated with the mobile device and/or perform other operations to validate the identity of the user. Upon a determination that the user and/or mobile device is valid, the administrator may send the unlock key to the mobile device.

At 630, the master key is extracted from the second encryption information using the unlock key. In various embodiments, the second encryption information includes the master key encrypted with the unlock key. In this case, the unlock key received from the server is used to decrypt the second encryption information, which includes the master key encrypted with the unlock key.

At 640, the master key is provided to one or more applications. In various embodiments, the master key extracted from the first encryption information is provided to librar(ies) associated with one or more applications. A library associated with the application may use the master key to access secured data (e.g., secured application data, files, etc.) on the mobile device.

At 650, a password reset operation is initiated. In various embodiments, a prompt is generated for a user to enter a new password, and a password reset operation is initiated. The process of resetting a password is discussed in detail below.

Figure 7:
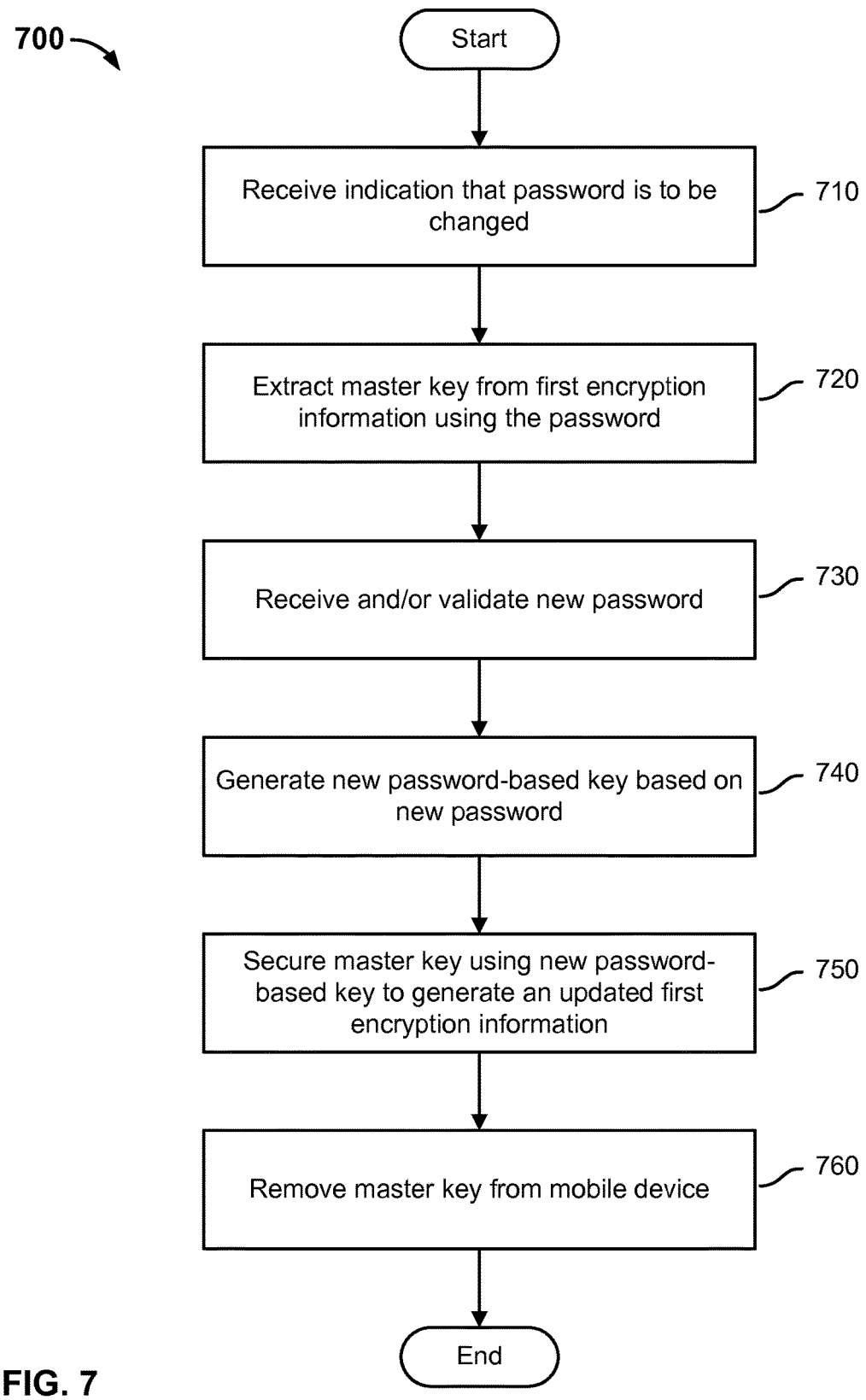
FIG. 7 is a flow chart illustrating embodiments of a process to change a mobile device password.

FIG. 7 is a flow chart illustrating embodiments of a process to change a mobile device password. At 710, an indication is received that the password is to be changed. A new password generation operation may be generated when a user loses their password, based on an expiration of a password, in response to a security threat, and/or at any other time. In some embodiments, a user may provide a request for the password to be changed, and the password change indication is received based on the request.

At 720, the master key is extracted from the first encryption information using the password. In various embodiments, the password in use prior to the change is used to extract the master key from the first encryption information stored on the device. In one example, a change password prompt may require a user to enter their current password (prior to the password change), and the current password is used to decrypt the first encryption information, which includes the master key encrypted with the current password.

At 730, a new password is received and/or validated. In various embodiments, a prompt is output to for a user to provide a new password. The new password may be received in response to the prompt. In some embodiments, a new password is validated to determine whether the new password meets certain password complexity requirements. For example, a password complexity requirement may dictate that a password include a certain number of characters, include a certain variety of characters (e.g., an upper case letter, a number, a symbol, etc.), and/or satisfy other requirements. In various embodiments discussed below, a password may be compared to previously used password to verify that the user is not attempting to reuse an old password.

At 740, a new password-based key is generated based on the new password. A new password-based key (e.g., a second password-based key) may be derived from the new password using a key derivation function, a hashing function, and/or other techniques. In some embodiments, the new password-based key is generated based on the new password, a salt, and/or other information. The salt may include the same salt that was used to generate the previous password-based key. As discussed herein, a same salt may be used for multiple operations on a device including, for example, generation of new password-based keys.

At 750, the master key is secured using the new password-based key to generate an updated first encryption information. In various embodiments, the master key is encrypted using the new password-based key to generate the updated first encryption information. In certain cases, the updated first encryption information may replace the previously stored encryption information in, for example, a key data storage on the mobile device.

At 760, the master key is removed from the device after generation of the updated first encryption information. In various embodiments, step 760 is optional. As discussed above, the master key may be temporarily stored in RAM during the generation of updated first encryption information on the mobile device. In this case, the RAM may be cleared after the generation of the updated first encryption information and the master key removed from the device.

Figure 8:
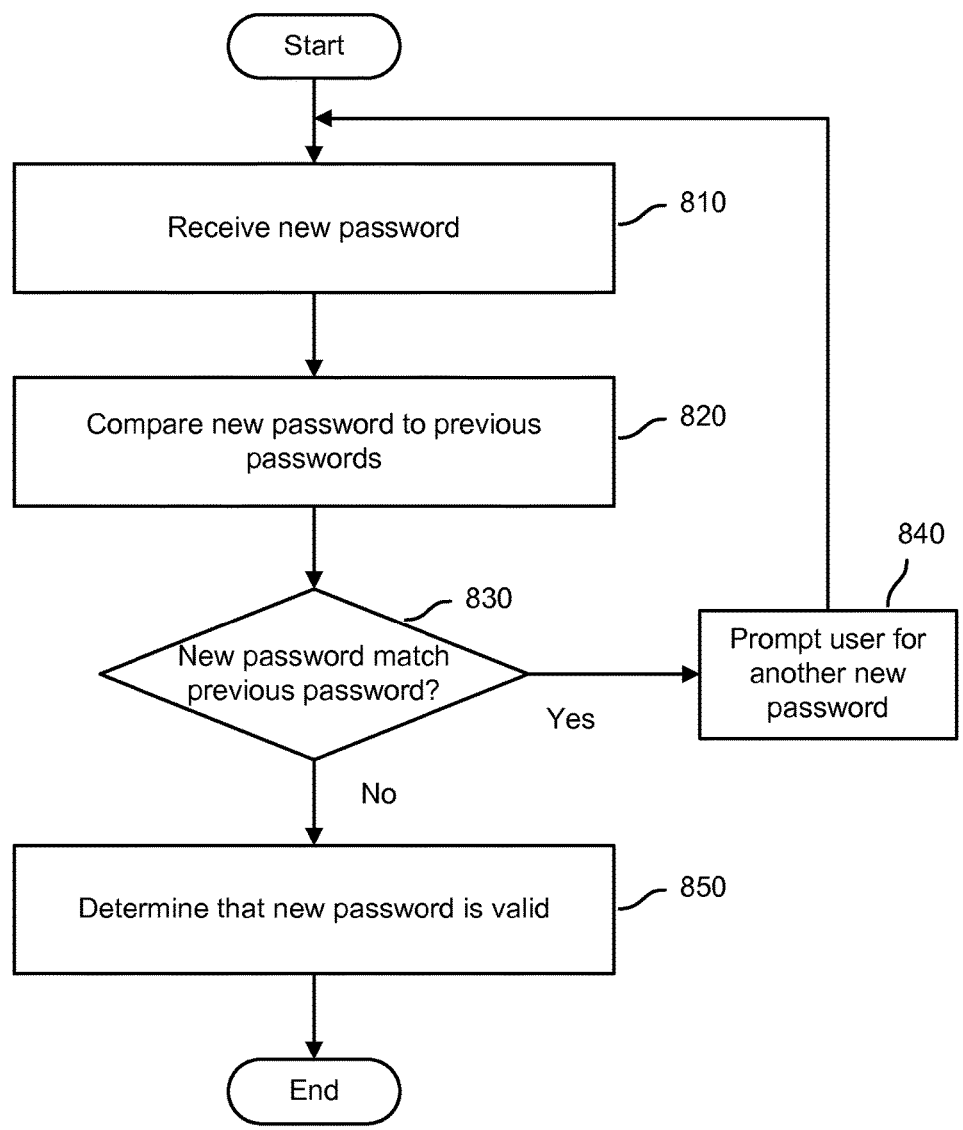
FIG. 8 is a flow chart illustrating embodiments of a process to validate a new password.

FIG. 8 is a flow chart illustrating embodiments of a process to validate a new password. In various embodiments, the process 800 is implemented by mobile device 110 of FIG. 1. The process 800 may be performed to validate a new password provided by a user in a new password generation operation, such as process 700 of FIG. 7. For example, the process 800 may be performed as part of step 730 of process 700. In some embodiments, the process 800 may be used to ensure that a new password entered by a user does not match any of a set of previously-used passwords (e.g., the ten (10) most recently used passwords). In certain cases, an enterprise may institute a policy requiring that a user not reuse old passwords. The process 800 may be used to enforce such a policy.

At 810, a new password is received. In various embodiments, a prompt is output for a user to provide a new password. The new password may be received in response to the prompt.

At 820, the new password is compared to one or more previous passwords. In various embodiments, an encrypted password history file is stored on the device. The encrypted password history file may include, for example, the ten (10) most-recently used passwords, dates of creation associated with each previously-used password, and/or other information. The encrypted password history file may be encrypted using, for example, the master key. In some embodiments, the new password is compared to the each of the previously-used passwords in the encrypted password history file.

In various embodiments, the encrypted password history file includes a hash associated with each of the previously-used passwords. The process of comparing the new password to the previously-used passwords in a list of previous password hash values is discussed in detail below.

At 830, it is determined whether the new password matches a previously-used password. In the event that the new password matches a previously used password, the process proceeds to step 840. In the event that the new password does not match any of the previously-used passwords, the process proceeds to step 850.

At 840, the user is prompted for an alternate new password. In various embodiments, a prompt is output to a user requesting that the user enter another new password.

At 850, it is determined that the new password is valid. The new password may be used to generate new first encryption information using the techniques disclosed herein (e.g., in process 700 of FIG. 7).

Figure 9:
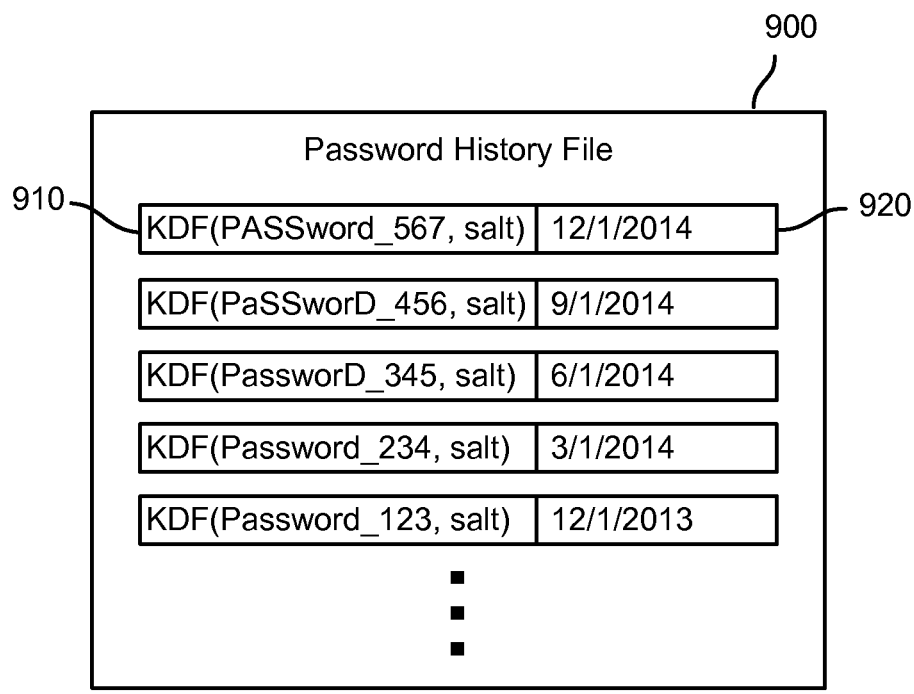
FIG. 9 is a diagram illustrating embodiments of a password history file.

FIG. 9 is a diagram illustrating embodiments of a password history file. In the example shown, a password history file 900 includes previous password information. The password history file 900 may be used to ensure that a new password selected by a user does not match any of a set of previously-used passwords (e.g., the ten (10) most recently used passwords). In some embodiments, the password history file 900 is encrypted using, for example, a master key and/or an encryption key derived from the master key. The password history file 900 may be encrypted with the master key so that the file 900 can be accessed using the unlock key in the event that the user loses the current password. Encrypting the password history file 900 with the master key may also ensure that the previously used passwords are not easily obtainable (e.g., not obtainable without compromising the device to retrieve the master key).

The password history file 900 may include hash values 910 (e.g., previous password hash values) for each of one or more previously-used passwords, a password creation date 920 associated with each previous password, and/or other information. In various embodiments, the password hash values 910 are generated using a key derivation function, such as PBKDF2 and/or any other key derivation function. To generate a hash value for a previous password, a key derivation function (e.g., PBKDF2) receives as inputs the previous password (e.g., PASSword_567 as shown in FIG. 9), a salt, a number of iterations, a desired length of the previous password hash value, and/or other information. The output of the key derivation function includes a hash value 910 for the previous password.

Storing the previous passwords as key derivation function-generated hash values 910 may help to ensure that the previous passwords stored in the password history 900 are less vulnerable to certain brute force attacks, dictionary attacks, and/or other potential threat vectors. By way of example, for an adversary to determine a previous password based on the hash values 910 in the password history file 900, the adversary would have to repeatedly guess a password, hash the guessed password (e.g., using PBKDF2), and/or compare the hash of the guessed password to the hashes 910 in the password file history 900. Successfully guessing a passcode using this technique may require millions of iterations through this guess and check process.

In various embodiments, the same salt is used to generate each hash value 910 in the password history file. As discussed below, using the same salt to generate each previous password hash value 910 may allow a candidate new password to be easily compared to the previous password hash values 910 in the password history file 900.

Figure 10:
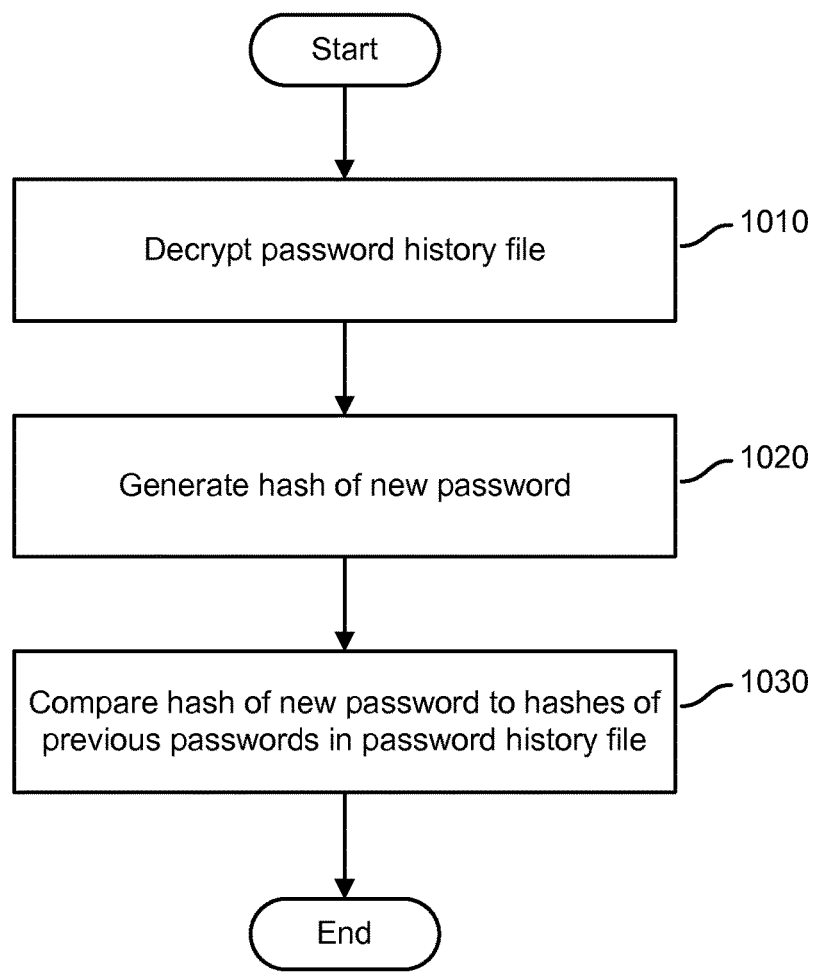
FIG. 10 is a flow chart illustrating embodiments of a process to compare a new password to previously used passwords.

FIG. 10 is a flow chart illustrating embodiments of a process to compare a new password to previously used passwords. In various embodiments, the process 1000 is implemented by mobile device 110 of FIG. 1. The process 1000 may be performed to compare a new password to one or more previously used passwords. In certain cases, the process 1000 may be performed as part of step 820 of process 800. At 1010, an encrypted password history file is decrypted. In various embodiments, the password history file is encrypted using a master key and/or a key derived from the master key. A key may be derived from the master key using, for example, a key derivation function, a keyed-hash message authentication code (HMAC) algorithm, and/or other techniques. To access the contents of the encrypted password history file, in certain cases, the master key is extracted from the first encryption information using the techniques disclosed herein, and the master key and/or a key derived from the master key is used to decrypt the encrypted password history file.

At 1020, a hash of a new password is generated. In various embodiments, a hash of a new password is generated using a key derivation function (e.g., PBKDF2) and/or other hash function. The key derivation function and/or hash function used to generate the hash of the new password may include the same key derivation function and/or hash function used to generate the previous password hash values stored in the password history file. In certain cases, the salt used to generate the hash of the new password may include the same salt used to generate each of the previous password hash values stored in the password history file.

At 1030, the hash of the new password is compared to hashes of previous passwords in the password history file. In some embodiments, the same key derivation function and/or hash function as well the same salt are used to generate the new password hash value and the previous password hash values. In this case, the new password hash value may be directly compared with the previous password hash values. In the event that the new password hash matches a previous password hash, it may be determined that the new passcode matches the previously used passcode associated with the matching hash. Based on the determined match, a prompt may be generated requesting the user to select another new password.

Figure 11:
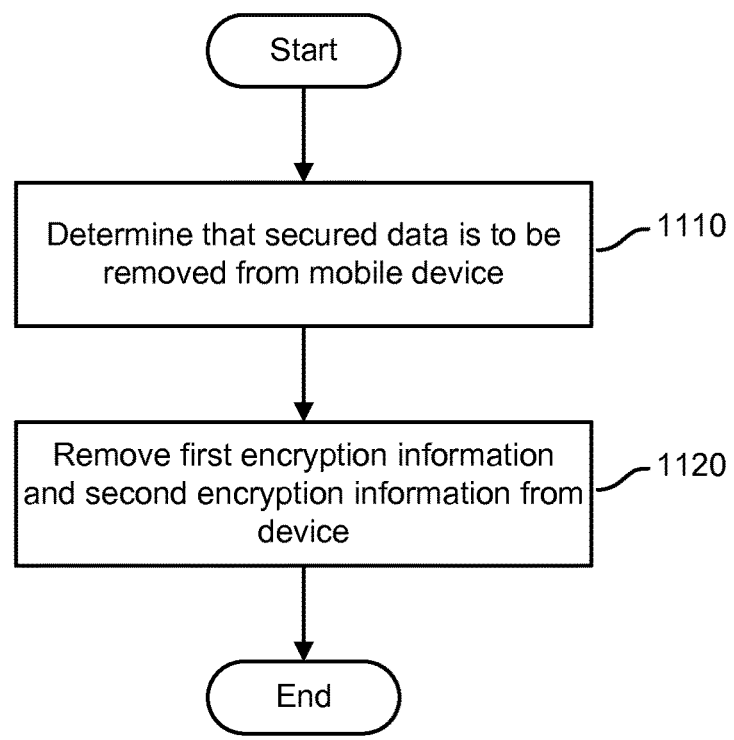
FIG. 11 is a flow chart illustrating embodiments of a process to wipe secured data from a mobile device.

FIG. 11 is a flow chart illustrating embodiments of a process to wipe secured data from a mobile device. At 1110, it is determined that secured data is to be removed from the mobile device. The determination to remove secure data from a mobile device may be made based on the occurrence of certain events including, for example, loss of the device, an employment status change associated with the mobile device user, a breach to the security of the device, an indication that the device is rooted, and/or any other event.

At 1120, the first encryption information and second encryption information are removed from the device. In various embodiments, removing the first encryption information and second encryption information from the device may effectively wipe at least a portion of the secured data on the device. As discussed above, the master key is not stored on the mobile device, server, and/or other node in clear text. In certain cases, the only sources from which to extract the master key include the first encryption information including the master key encrypted using a password-based key, and the second encryption information including the master key encrypted using an unlock key. By deleting the first encryption information and the second encryption information from the device, the master key is also removed. And any files encrypted using the master key and/or a key derived therefrom are inaccessible without the master key. Without access to the master key, the secure files on the device are effectively wiped.

Figure 12:
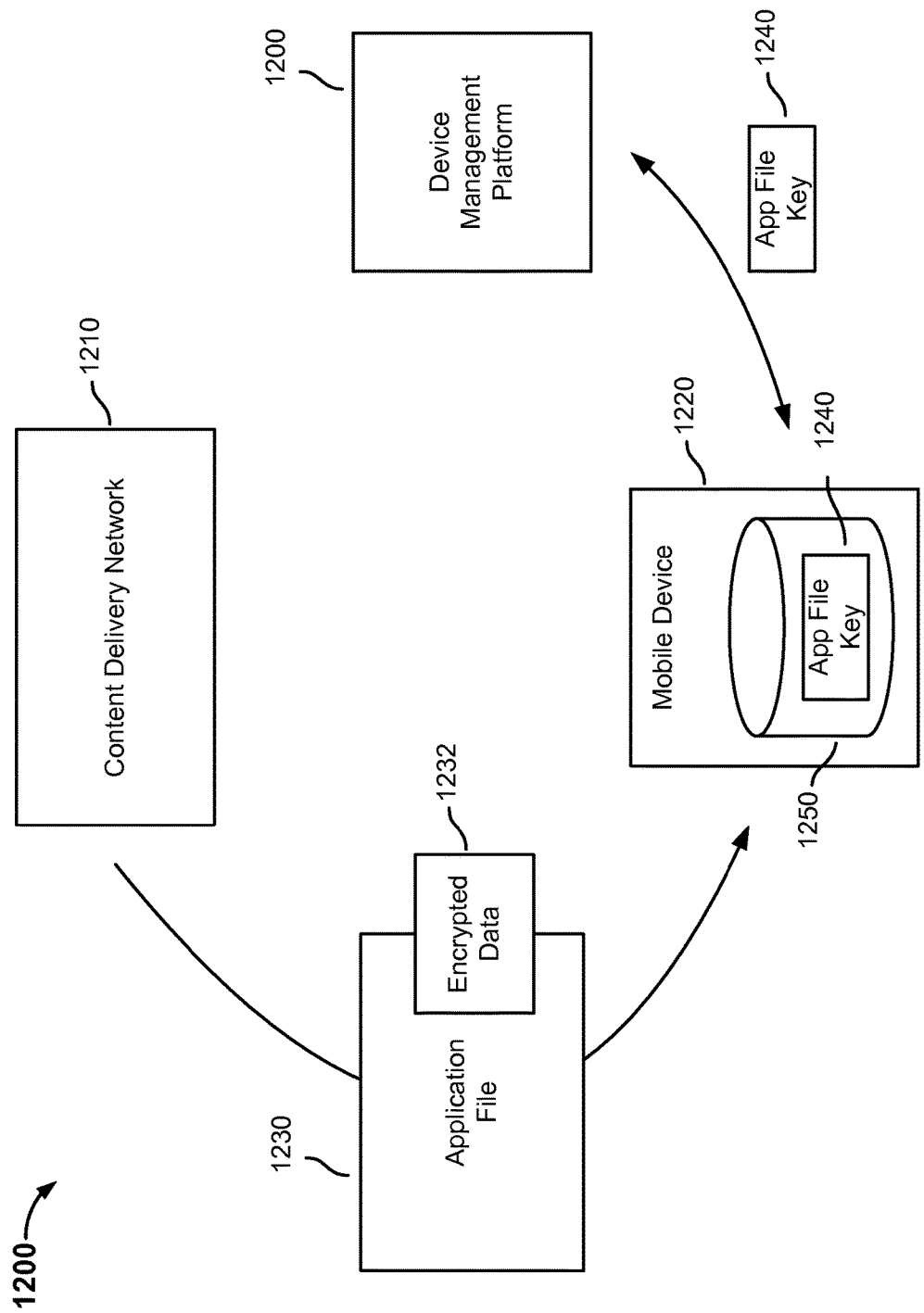
FIG. 12 is a block diagram illustrating embodiments of a system to securely send application data to mobile device.

FIG. 12 is a block diagram illustrating embodiments of a system to securely send application data to mobile device. In various embodiments, a device management platform 1200 (e.g., device management platform 120 of FIG. 1) uses various content delivery networks 1210 to distribute applications 1230 to various mobile devices 1220 (e.g., across enterprise). The device manage server 1200 and enterprise associated therewith, in certain cases, may want to encrypt certain content in application 1230, such as files including sensitive information (e.g., a database of employee addresses), confidential information (e.g., enterprise proprietary information), and/or other information. In various embodiments, the application 1230 (e.g., an .apk file, .app file, etc.) sent to the content delivery network 1210 for delivery to various mobile devices 1230 includes encrypted data 1232. The encrypted data 1232 may be encrypted using an application file key 1240. The content delivery network 1210 provides the application 1230 to the mobile device 1220. The mobile device 1220 receives the application, and may determine that the application 1230 includes encrypted data 1232. The mobile device 1220 may contact the device management server 1200 to retrieve an application file key 1240 to access the encrypted data 1232. Prior to providing the application file key 1240 to the device 1220, the device management platform 1200 may verify the identity of the mobile device 1220 and/or mobile device user. Once the mobile device 1220 has been validated, the application file key 1240 is provided to the mobile device 1220. The mobile device 1220 uses the application file key 1240 to access the encrypted data 1232 in the application 1230. The application file key 1240 may include a master key for the encrypted data 1232 in the application 1230. In some embodiments, the mobile device 1220 may cache the application file key 1240 in device storage 1250 so the encrypted data 1232 can be easily accessed at a later time. A cache including application file keys 1240 may be encrypted using a master key associated with the mobile device 1220.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
securing a master key using a password-based key to generate a first encryption information, the password-based key generated based at least in part on a password associated with a mobile device;
securing the master key using an unlock key to generate a second encryption information, wherein the unlock key is stored at a server;
deleting the master key from the mobile device after generating the first encryption information and the second encryption information, wherein deleting the master key from the mobile device renders secured data on the mobile device inaccessible; and
storing the first encryption information and the second encryption information on the mobile device, wherein the mobile device is configured to:
extract the master key from the first encryption information using the password; and
in the event that the master key is not extracted using the password, extract the master key from the second encryption information using the unlock key received from the server, wherein to receive the unlock key from the server, the server is configured to authenticate an identity associated with a user of the mobile device.

2. The method of claim 1, wherein the password-based key is generated based at least in part on the password associated with the mobile device and a salt.

3. The method of claim 1, wherein the unlock key is not stored on the mobile device.

4. The method of claim 1, wherein the master key and the unlock key are generated at the mobile device.

5. The method of claim 4, further comprising:
sending the unlock key to the server upon generation of the second encryption information; and
deleting the unlock key from the mobile device.

6. The method of claim 1, wherein the master key and the unlock key are generated at the server.

7. The method of claim 6, wherein the step of securing the master key using the unlock key to generate the second encryption information is performed at the server.

8. The method of claim 7, wherein the server deletes the master key after generating the second encryption information.

9. The method of claim 7, further comprising sending the second encryption information and the unlock key to the mobile device.

10. The method of claim 9, wherein the step of securing the master key using the password-based key to generate the first encryption information is performed at the mobile device.

11. The method of claim 1, further comprising:
receiving input including the password;
extracting the master key from the first encryption information using the password; and
providing the master key to an application, wherein the application uses the master key to access data encrypted using the master key.

12. The method of claim 1, further comprising:
determining that data is to be removed from the mobile device; and
removing, based at least in part on the determination, the first encryption information and second encryption information from the mobile device.

13. The method of claim 1, further comprising:
receiving a lost password indication;
sending a request to the server to retrieve the unlock key; and
extracting the master key from the second encryption information using the unlock key received from the server.

14. The method of claim 1, further comprising:
receiving an indication that the password is to be changed;
extracting the master key from the first encryption information using the password; and
securing the master key using a second password-based key to generate an updated first encryption information, the second password-based key generated based at least in part on a new password.

15. The method of claim 1, further comprising:
determining that the password is to be changed;
receiving a new password;
comparing the new password to one or more previous passwords, the previous passwords included in a password history file encrypted using the master key; and
determining that the new password is valid based at least in part on the comparison.

16. The method of claim 15, wherein the password history file includes:
one or more hashes of previous passwords, each hash derived from a previous password and a salt.

17. The method of claim 16, wherein each of the one or more hashes are derived using the same salt.

18. The method of claim 17, wherein comparing includes:
generating a hash of the new password using the salt; and
comparing the hash of the new password to the one or more hashes of previous passwords included in the password history file.

19. A system, comprising:
a processor; and
a memory coupled with the processor, wherein the memory is configured to provide the processor with instructions which when executed cause the processor to:
secure a master key using a password-based key to generate a first encryption information, the password-based key generated based at least in part on a password associated with a mobile device;
secure the master key using an unlock key to generate a second encryption information, wherein the unlock key is stored at a server;
delete the master key from the mobile device after generating the first encryption information and the second encryption information, wherein deleting the master key from the mobile device renders secured data on the device inaccessible; and
store the first encryption information and the second encryption information on the mobile device, wherein the mobile device is configured to:
extract the master key from the first encryption information using the password; and
in the event that the master key is not extracted using the password, extract the master key from the second encryption information using the unlock key received from the server, wherein to receive the unlock key from the server, the server is configured to authenticate an identity associated with a user of the mobile device.

20. A computer program product, the computer program product being embodied in a tangible non-transitory computer readable storage medium and comprising computer instructions for:
securing a master key using a password-based key to generate a first encryption information, the password-based key generated based at least in part on a password associated with a mobile device;
securing the master key using an unlock key to generate a second encryption information, wherein the unlock key is stored at a server;
deleting the master key from the mobile device after generating the first encryption information and the second encryption information, wherein deleting the master key from the mobile device renders secured data on the device inaccessible; and
storing the first encryption information and the second encryption information on the mobile device wherein the mobile device is configured to:
extract the master key from the first encryption information using the password; and
in the event that the master key is not extracted using the password, extract the master key from the second encryption information using the unlock key received from the server, wherein to receive the unlock key from the server, the server is configured to authenticate an identity associated with a user of the mobile device.

\* \* \* \* \*